United States Patent [19]

Rolnicki et al.

[11] Patent Number: 5,378,103
[45] Date of Patent: Jan. 3, 1995

[54] DOOR TRANSPORTING AND ELEVATING APPARATUS

[76] Inventors: Gregory R. Rolnicki, 301 W. Vorhees St., Danville, Ill. 61832; Joseph M. Rolnicki, 12553-I Lighthouse Way Dr., St. Louis, Mo. 63141

[21] Appl. No.: 17,477

[22] Filed: Feb. 12, 1993

[51] Int. Cl.⁶ ............................................. B62B 1/26
[52] U.S. Cl. ................................ 414/10; 269/905; 280/47.12; 280/47.23; 280/79.7
[58] Field of Search ............... 269/17, 905; 280/47.1, 280/47.12, 47.23, 79.7; 414/10, 490

[56] References Cited

U.S. PATENT DOCUMENTS

| | | | |
|---|---|---|---|
| D. 310,894 | 9/1990 | Smith | 280/79.7 X |
| 2,558,404 | 6/1951 | Watson | 269/17 |
| 3,306,624 | 2/1967 | Goss | 280/79.7 X |
| 4,488,733 | 12/1984 | Hellsten | 280/79.7 X |
| 4,492,369 | 1/1985 | Pohl | 269/905 X |
| 4,978,132 | 12/1990 | Wilson et al. | 280/79.7 X |
| 5,158,312 | 10/1992 | Lausch | 280/79.7 |
| 5,244,221 | 9/1993 | Ward | 414/490 X |

*Primary Examiner*—Frank E. Werner
*Assistant Examiner*—Janice L. Krizek
*Attorney, Agent, or Firm*—Rogers, Howell & Haferkamp

[57] ABSTRACT

The present invention relates to a swing-type door transporting and elevating apparatus. In particular, the present invention relates to an apparatus employed to facilitate the transporting of a swing-type door to a door jamb in which the door is to be hung, and is then employed in elevating the door to a desired height level to the jamb to interfit and pivotally connect hinge leaf knuckles between the door and jamb.

15 Claims, 2 Drawing Sheets

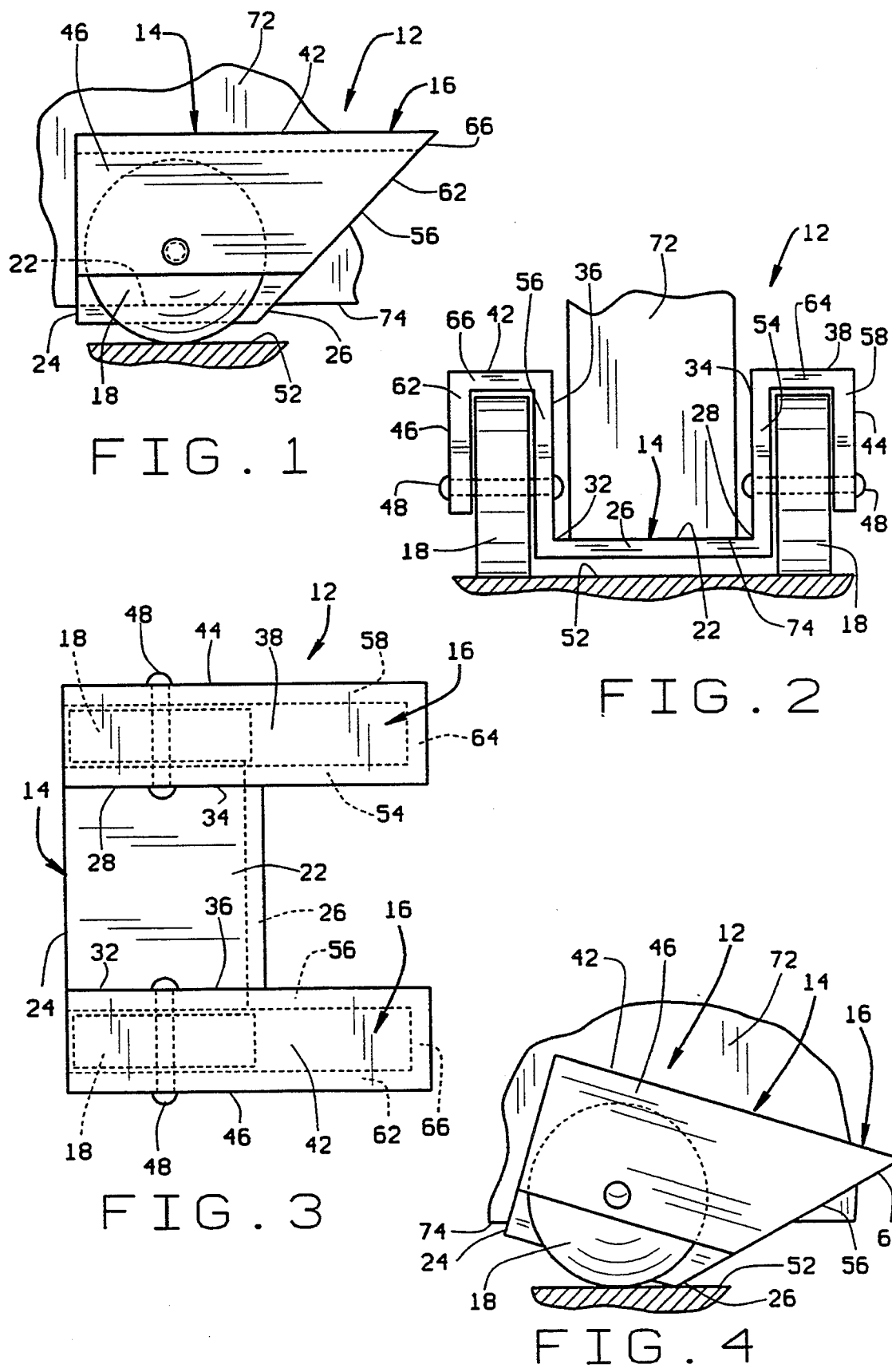

DOOR TRANSPORTING AND ELEVATING APPARATUS

BACKGROUND OF THE INVENTION

1. Field of the Invention

The present invention relates to a swing-type door transporting and elevating apparatus. In particular, the present invention relates to an apparatus employed to facilitate the transporting of a swing-type door to a door jamb in which the door is to be hung, and is then employed in elevating the door to a desired height level to the jamb to interfit and pivotally connect hinge leaf knuckles between the door and jamb.

2. Description of Related Art

In the prior art, a swing-type door is typically hung in a door jamb by first manually carrying the door to the door jamb and then manually elevating the door relative to the jamb so that hinge leaves secured to one edge of the door are interfit, at the hinge knuckles, with complementary hinge leaves secured to the door jamb. A hinge pin is then inserted into the interfit hinge leaves to pivotally connect the door to the door jamb.

Due to the size and weight of a typical swing-type door, it is very difficult for one person to manually carry the door to a door jamb and often two people are required to carry a typical door. This is especially true with solid core wood doors or doors constructed entirely of metal. The increased weight of such doors makes it very difficult for one person to carry a door to a door jamb in which it is to be hung. Once the door is carried to its door jamb and complementary hinge leaves are assembled to one side of the door and one side of the jamb, the door is then typically manually lifted and held a short distance above the floor between the jamb so that the complementary hinge leaves on the door and the jamb may be interfit at the knuckles. Due to the awkwardness of the door size and its weight, and due to the small tolerance usually allowed between interfitting knuckles of the hinges, it is a very difficult task for a single person to lift the door relative to the jamb to interfit the complementary knuckles of the hinge leaves secured to the door and jamb. The interfitting of complementary hinge leaves is a difficult task for even two people. Again this is especially true with solid core wood doors and all metal doors due to their weight. Often a screw-driver or other readily available tool is inserted beneath the bottom edge of the door, to support the door in its elevated position relative to the jamb so that the knuckles of the hinges of the door and jamb may be interfit.

SUMMARY OF THE INVENTION

The present invention overcomes the disadvantages associated with prior methods of hanging doors in door jambs by providing an apparatus that may be used to support and easily transport a door to its jamb and then may be used to easily elevate the door relative to the jamb to facilitate interfitting the complementary hinge leaves, at the knuckles, of the door and jamb. The present invention is basically comprised of a base supported on at least one pair of rollers where a portion of the base is configured as a lever arm for elevating the door.

The base of the apparatus has a general U-shaped configuration with the bottom of the base being substantially flat to support a door thereon. The base has a pair of laterally spaced side walls that gives the base its U-shaped configuration. The spacing between the side walls is sufficient to enable the door to be placed on its bottom edge between the side walls and on the top surface of the base bottom. The base is supported by at least one pair of rollers with each roller of the pair being positioned on opposite laterally outboard sides of the base sidewalls. The rollers are connected to the sidewalls for rotation relative to the sidewalls and together elevate the bottom of the base a small distance above a surface over which the pair of rollers are rolled. A lateral edge of the base bottom serves as a fulcrum edge and the side walls extend longitudinally over the fulcrum edge as they extend upward from this edge. The projection of the sidewalls forms a pair of lever arms on opposite parallel sides of the base.

In use, a typical swing-type door is placed on the apparatus with the bottom edge of the door inserted between the base sidewalls and on top of the top surface of the base. With the door supported on the base it may then be balanced between the pair of rollers so that the entire weight of the door is supported by the apparatus. With the door balanced on the rollers it may then be easily transported to its desired location by the rollers of the apparatus by either pushing or pulling the door. The pushing or pulling of the door causes the rollers of the apparatus to roll over the floor of the building in which the door is being installed and thereby transport the door to the desired door jamb in the building in which the door is to be hung.

Once complementary hinge leaves are assembled to a side edge of the door and one side of the door jamb, the apparatus is then used to position the door in its desired position relative to the door jamb prior to elevating the door to interfit the hinge leaves of the door and jamb at the knuckles. With the door positioned in its desired position relative to the door jamb, the operator of the apparatus then steps down on one of the two lever arms. Stepping down on the lever arm causes the apparatus to pivot about the center axis of its rollers and causes the fulcrum edge of the base to come into contact with the building floor surface. Continued downward pressure on the lever arm causes the apparatus to pivot about the contact of the fulcrum edge with the floor thereby elevating a lateral edge of the base bottom opposite the fulcrum edge. The elevation of the base lateral edge opposite the fulcrum serves to elevate the door relative to the door jamb and thereby positions the knuckles of the door hinge leaves in their desired position interfitting the knuckles of the jamb hinge leaves. The complementary hinge leaves of the door and jamb are then interfit, at the knuckles, and a hinge pin is inserted through the knuckles to complete the assembly of the door onto the door jamb. The apparatus of the invention is then rolled out from beneath the door bottom edge to complete the installation of the door to the door jamb.

BRIEF DESCRIPTION OF THE DRAWINGS

Further objects and features of the present invention are revealed in the following detail description of the preferred embodiment of the invention and in the drawing figures wherein:

FIG. 1 is a side elevation view of the apparatus of the invention;

FIG. 2 is a rear elevation view of the apparatus;

FIG. 3 is a top plan view of the apparatus;

FIG. 4 is a side elevation view of the apparatus of FIG. 1 being used to elevate a door;

DETAILED DESCRIPTION OF THE PREFERRED EMBODIMENTS

Figure 5:
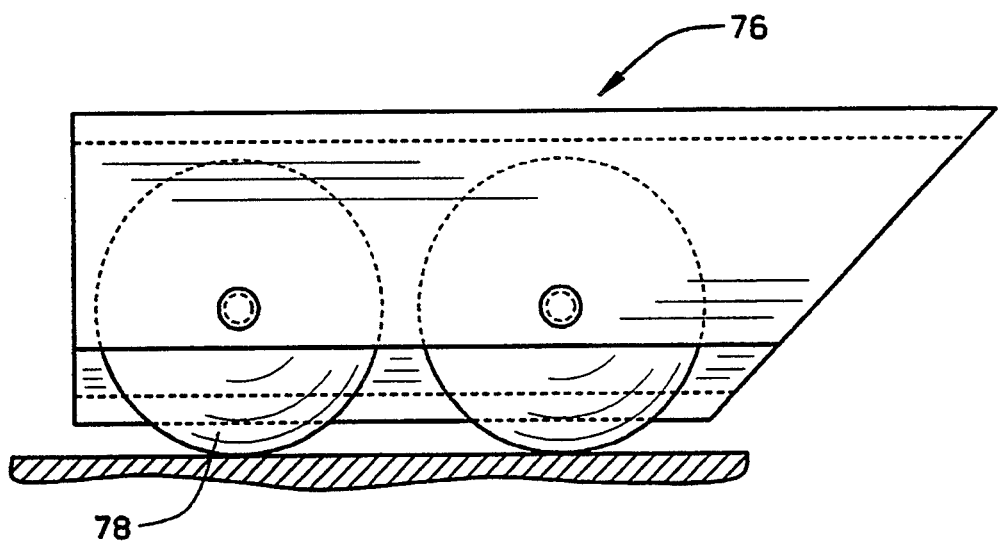
FIG. 5 is a side elevation view of a second embodiment of the apparatus.

FIGS. 1 through 4 show the first embodiment of the apparatus of the invention. The apparatus 12 is basically comprised of the base 14, a pair of lever arms 16 connected with the base, and a pair of roller wheels 18 mounted to the base. The component parts of the apparatus may be constructed of metal or from other materials sufficiently rigid to support the weight of a conventional wood or metal door without significantly deforming. The choice of materials selected in constructing the component parts of the apparatus is illustrative only and should not be interpreted as limiting.

As seen in the drawing figures the base 14 includes a support surface 22 having a general rectangular configuration with a first, forward end 24 and a longitudinally opposite second, rearward end 26 and laterally spaced side edges 28 and 32. A pair of laterally spaced sidewalls 34 and 36 extend vertically upward from the respective side edges 28 and 32 of the support surface. The sidewalls are laterally spaced a sufficient distance apart to enable the placement of a conventional swing-type door between the sidewalls and onto the support surface 22. What is meant by a "swing-type door" is a conventional door of wood or metal construction that is typically mounted in a jamb by hinges that enable the door to swing about a vertical axis.

A top wall 38 and 42 extends laterally outward from the topmost edges of the respective sidewalls 34 and 36 and exterior walls 44 and 46 extend downward from the outward most edges of the respective top walls 38 and 42. As is best seen in FIG. 2, the top walls 38 and 42 laterally space their respective exterior walls 44 and 46 outward from and positioned parallel to their respective sidewalls 34 and 36 leaving a void opening between the exterior walls and the sidewalls.

In the preferred embodiment of the invention the support surface 22, sidewalls 34 and 36, top walls 38 and 42, and exterior walls 44 and 46 of the base are all formed by a conventional stamping process from a single sheet of metal. However, each of the component parts of the base 14 described above may be formed by other processes such as casting or other means of assembling the separate component parts together without departing from the intended scope of the invention.

The pair of roller wheels 18 are mounted for rotation relative to the base 14 in the void opening provided between the base sidewalls 34 and 36 and their respective exterior walls 44 and 46. Each of the roller wheels 18 are provided with a center opening (not shown) through which a pin 48 is inserted. The base sidewalls 34 and 36 and exterior walls 44 and 46 are also provided with coaxial holes that align with the center holes of the roller wheels 18 and through which the pins 48 are inserted to mount the roller wheels to the base for rotation of the wheels relative to the base. The opposite ends of the roller pins 48 are flattened once inserted through the aligned holes of the base sidewalls, the roller wheel center holes, and the base exterior walls, thereby mounting the roller wheels to the sidewalls for rotation of the wheels relative to the sidewalls. As is best seen in FIG. 2, the roller wheels have a center axis of rotation that is spaced vertically above the support surface 22 of the base. This enables the base to support a swing-type door only a small distance above a surface 52, the small distance being much smaller than the distance of the center axis of the rotation of the roller wheels above the surface.

In a variant embodiment of the invention the roller wheels of the type shown in the drawing figures may be replaced by conventional casters mounted to the top walls 38 and 42 of the base for both pivoting and rolling movement of the casters relative to the base.

The lever arms 16 are formed as longitudinal extensions of the base sidewalls, top walls and exterior walls. As is best seen in FIG. 1, as the base sidewalls 34 and 36 extend upward from the second end 26 of the support surface, the rearward or right hand edge 54 and 56 of the respective sidewalls 34 and 36 extends longitudinally away way from the second end 26 of the support surface. The rearward or right hand edges 58 and 62 of the exterior walls 44 and 46 have the same angled configuration as the base sidewalls and extend longitudinally away from the support surface rearward end 26 as they extend upward from the rearward end. The top walls 38 and 42 connecting the sidewalls 34 and 36 to their respective exterior walls 44 and 46 have rearward or right hand edges 64 and 66 that are spaced longitudinally rearward from the support surface rearward end 26 due to the configuration of the sidewalls and exterior walls. The longitudinal extensions of the sidewalls, exterior walls, and top walls form the pair of lever arms 16 on the base 14 with the support surface rearward end 26 serving as a fulcrum edge. The lever arms 16 may be employed to first cause the support surface rearward end 26 to be engaged downward against the surface 52, and then to elevate the support surface forward end 24 relative to the rearward end 26 as the lever arms 16 are moved downward relative to the rearward end. Alternatively, the lever arms 16 are employed to cause the support surface forward end 24 to move downward and return to its original position relative to the support surface rearward end 26 in response to the lever arms 16 being moved upward relative to the support surface rearward end.

In operation of the apparatus of the invention 12 in transporting a door to a door jamb and then elevating the door relative to the jamb to enable hinge leaves on the door to be connected with hinge leaves on the door jamb, the apparatus 12 is first placed on the surface 52 over which it is to transport the door. The door 72 is then placed between the base sidewalls 34 and 36 and is supported on the base support surface 22 as shown in FIGS. 1 and 2. With the door placed on the base support surface 22, an operator of the apparatus may then balance the door on the roller wheels 18 of the apparatus with no portion of the door bottom edge 74 touching the surface 52 over which the door is to be transported. The door may now easily be transported over the surface 52 by employing the apparatus as a conveying means for the door. The rollers 18 support the bottom edge of the door only a small distance above the surface 52 and easily convey the door to its desired location where it is to be assembled to a door jamb. Once the door has been conveyed by the apparatus to its desired location, the apparatus can then be used to easily adjust the vertical height of the door relative to the surface to align the hinge leaves of the door and door jamb prior to their being interfit with each other. By the operator of the apparatus stepping downward onto the top walls 38 and 42 adjacent to their rearward edges 64 and 66 the lever arm pivots downward about the center axis of rotation of the roller wheels 18 and the support surface forward end 24 pivots upward about the roller wheels center axis. As the support surface forward end 24 pivots upward it also elevates the door 72 above the surface 52. The elevation of the door provided by this pivoting movement of the apparatus about the roller wheels center axis may be sufficient to elevate the door to its desired position relative to the door jamb to interfit the hinge leaves of the door and the jamb. However, the apparatus of the invention is also capable of elevating the door relative to the surface still further.

By the operator continuing to step downward on the rearward edges 64 and 66 of the top walls, the support surface rearward end 26 eventually comes into contact with the surface 52. At this point the support surface rearward end 26 functions as a fulcrum for the lever arms 16. By continuing to step downward on the top wall rearward edges 64 and 66 the lever arms 16 now pivot downward about the line of engagement of the support surface rearward end 26 and the surface 52. This continued pivoting downward movement of the lever arms 16 causes the support surface forward end 24 to be still further elevated relative to the surface 52. The further elevation of the support surface forward end 24 elevates the door 72 still further relative to the surface 52. The door is balanced on the top of the support surface forward end 24 and the height of the door relative to the door jamb and surface 52 are continued to be adjusted by stepping downward on or lifting the foot upward from the rearward edges 64 and 66 of the top wall until the door hinge leaves are positioned in their desired position relative to the jamb hinge leaves to permit interfitting of the hinge leaves. When the door is positioned by the apparatus in its desired position relative to the door jamb and is hung for swinging movement relative to the jamb by hinges the operator then steps off of the lever arm of the apparatus allowing the apparatus to return to its position relative to the surface 52 shown in FIG. 1. With the door now being hung in the jamb it will be elevated by the hinges slightly above the support surface 22 of the apparatus and the apparatus may now be easily moved over the surface 52 by the roller wheels 18 beneath the bottom edge 74 of the door until it is removed from beneath the door edge opposite the connection of the door to the door jamb by the hinges. In this manner the apparatus of the invention provides a simple and inexpensive means of easily transporting a swing-type door to a door jamb in which it is to be hung and then elevating the door to a desired position relative to the door jamb to permit the interfitting of the hinge leaves to hang the door in the jamb.

Figure 6:
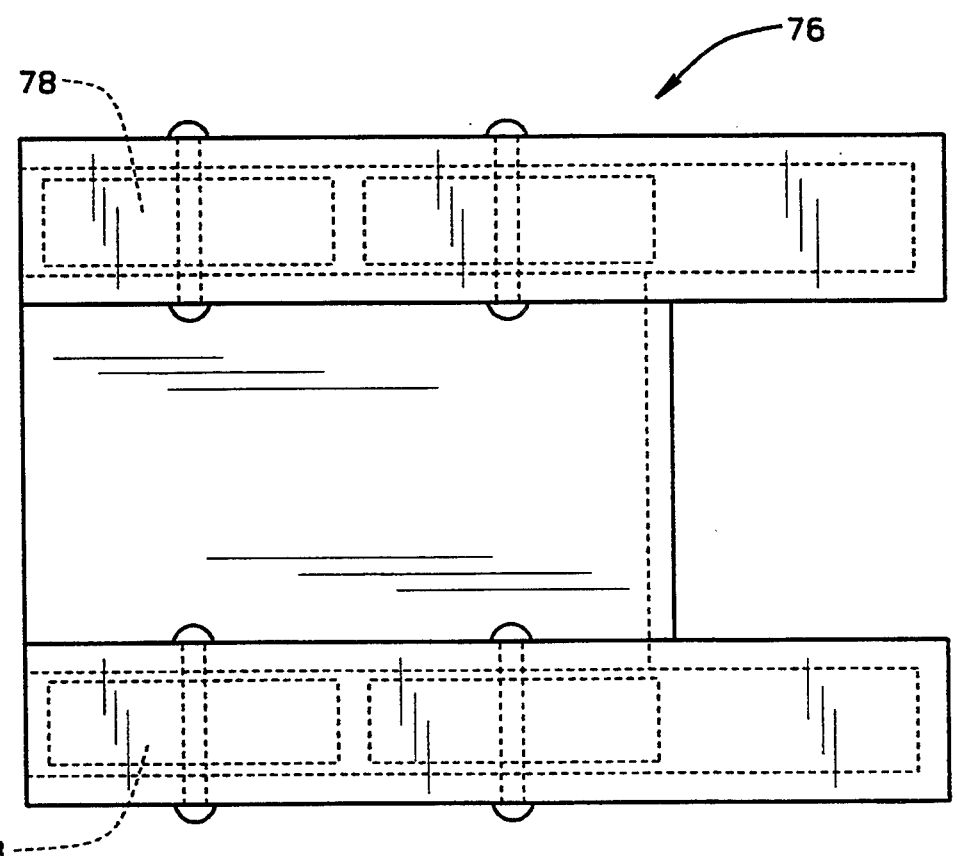
FIG. 6 is a top plan view of the embodiment of the apparatus of FIG. 5.

FIGS. 5 and 6 show a second embodiment of the apparatus 76 of the invention. The second embodiment employs may of the component parts of the first embodiment and the same reference numerals followed by a prime are employed in labeling the component parts of the second embodiment of the apparatus. The only differences between the first and second embodiments of the apparatus include the longitudinal extensions of the base sidewalls, top walls, and exterior walls, and the addition of a second pair of roller wheels 78 to the apparatus. The second pair of wheels 78 are mounted to the base in the same manner as the first set of wheels 18' described above. The second embodiment also functions in the same manner described above with reference to the first embodiment except that by providing an additional pair of roller wheels 78 it is not necessary for the operator of the second embodiment of the apparatus to balance the door (not shown) on the apparatus as it is transported by the apparatus to its desired location.

While the present invention has been described by reference to specific embodiments it should be understood that modifications and variations of the invention may be constructed without departing from the scope of the invention defined in the following claims.

What is claimed is:

1. An apparatus for transporting a swing-type door having a bottom plane over a surface, and for selectively raising and lowering the door relative to the surface with the door bottom plane substantially parallel with the surface, the apparatus comprising:

a base configured to receive a swing-type door thereon and to support the door over the surface with the door bottom plane substantially parallel with the surface;

means provided on the base for supporting the base on the surface and for conveying the base over the surface and thereby enabling the base to transport a swing-type door supported on the base over the surface from one location to a second location;

means provided on the base for selectively enabling raising and lowering at least a portion of the base relative to the surface and thereby selectively enabling raising and lowering, respectively, a swing-type door supported on the base relative to the surface with the door bottom plane substantially parallel with the surface;

the means for supporting the base on the surface and for conveying the base over the surface includes at least a pair of rollers with each roller of the pair being positioned on an opposite lateral side of the base and each roller of the pair being mounted on the base for rotation of the roller relative to the base;

the base has longitudinally opposite first and second ends and a support surface extending between the first and second ends, and the base has a pair of laterally spaced sidewalls that extend upward from opposite lateral side edges of the base support surface, the sidewalls having a lateral spacing therebetween sufficiently dimensioned to enable a swing-type door to be placed between the sidewalls and on the base support surface; and, each roller of the pair of rollers is mounted to a sidewall of the pair of sidewalls with the rollers being coaxial and having a lateral axis of rotation positioned vertically above the base support surface.

2. The apparatus of claim 1, wherein:

the means for selectively enabling raising and lowering at least a portion of the base includes at least one lever arm connected to the second end of the base, wherein the lever arm has a configuration that causes the first end of the base to rise relative to the second end of the base in response to the lever arm moving downward relative to the second end of the base, and that causes the first end of the base to lower relative to the second end of the base in response to the lever arm moving upward relative to the second end of the base.

3. The apparatus of claim 2, wherein:

the lever arm extends longitudinally away from the base second end and vertically above the support surface.

4. The apparatus of claim 3, wherein:

the means for selectively enabling raising and lowering at least a portion of the base includes a second lever arm connected to the second end of the base, the second lever arm having a configuration substantially identical to the configuration of the one lever arm, and the one and second lever arms being laterally spaced on opposite sides of the base support surface enabling a swing-type door to be placed between the one and second lever arms and supported on the base support surface.

5. The apparatus of claim 2, wherein:
the lever arm has a configuration that causes the second end of the base to function as a fulcrum for the lever arm as the lever arm is moved downward and upward relative to the second end of the base.

6. The apparatus of claim 1, wherein:
the means for supporting the base on the surface and for conveying the base over the surface includes a second pair of rollers with each roller of the second pair being mounted to a sidewall of the pair of sidewalls and with the second pair of rollers being coaxial and having a lateral axis of rotation positioned vertically above the base support surface.

7. An apparatus for transporting a swing-type door over a surface, and for selectively raising and lowering the door relative to the surface to facilitate hanging the door on a hinge, the apparatus comprising:
a base configured to receive a swing-type door thereon and to support the door over the surface, the base having a longitudinal length with opposite forward and rearward edges and the base having a lateral width with opposite side edges;
at least a pair of rollers mounted on opposite lateral sides of the base for rotation relative thereto, and for supporting the base on the surface and conveying the base over the surface and thereby enabling the base to transport a swing-type door supported on the base over the surface from one location to a second location;
at least one lever arm projecting longitudinally from the base for selectively enabling raising and lowering at least a portion of the base relative to the surface and thereby selectively enabling raising and lowering, respectively, a swing-type door supported on the base relative to the surface;
a pair of laterally spaced sidewalls project upwardly from the laterally spaced side edges of the base, and the lever arm projects longitudinally from one of the sidewalls; and
the pair of sidewalls extend longitudinally along the side edges of the base between the base forward and rearward edges, and the lever arm projects longitudinally and rearwardly from the base rearward edge as a continuous extension of one of the sidewalls.

8. The apparatus of claim 7, wherein:
the pair of rollers have a common lateral axis and the lever arm projects upwardly from the base above the axis of the rollers.

9. The apparatus of claim 7, wherein:
the lever arm projects longitudinally and upwardly from the rearward edge of the base.

10. The apparatus of claim 7, wherein:
the lever arm has a surface configured to enable a downward force to be exerted thereon, and the lever arm projects from the base in a configuration that would cause the forward edge of the base to move upwardly and the rearward edge of the base to move downwardly in response to a downward force exerted on the lever arm surface causing the lever arm surface to move downwardly.

11. The apparatus of claim 7, wherein:
the lever arm projects upwardly from the one sidewall above the axis of the rollers.

12. The apparatus of claim 7, wherein:
a pair of lever arms including the one lever arm project longitudinally from opposite lateral sides of the base.

13. The apparatus of claim 12, wherein:
the pair of lever arms project rearwardly and upwardly from the rearward edge of the base.

14. The apparatus of claim 12, wherein:
the pair of rollers have a common lateral axis and the pair of lever arms project upwardly from the base above the axis of the rollers.

15. An apparatus for transporting a swing-type door over a surface, and for selectively raising and lowering the door relative to the surface to facilitate hanging the door on a hinge, the apparatus comprising:
a base configured to receive a swing-type door thereon and to support the door over the surface, the base having a longitudinal length with opposite forward and rearward edges and the base having a lateral width with opposite side edges;
at least a pair of rollers mounted on opposite lateral sides of the base for rotation relative thereto, and for supporting the base on the surface and conveying the base over the surface and thereby enabling the base to transport a swing-type door supported on the base over the surface from one location to a second location;
at least one lever arm projecting longitudinally from the base for selectively enabling raising and lowering at least a portion of the base relative to the surface and thereby selectively enabling raising and lowering, respectively, a swing-type door supported on the base relative to the surface;
a pair of laterally spaced sidewalls project upwardly from the laterally spaced side edges of the base, and the lever arm projects longitudinally from one of the sidewalls; and,
a pair of lever arms including the one lever arm project longitudinally from the opposite lateral sidewalls of the base, each lever arm projecting from a sidewall rearwardly of the base rearward edge.

* * * * *